(12) United States Patent
Bernhard

(10) Patent No.: US 6,438,813 B1
(45) Date of Patent: Aug. 27, 2002

(54) ROTARY DRIVE WITH A SPEED

(75) Inventor: Franz-Xaver Bernhard, Spaichingen (DE)

(73) Assignee: Maschinenfabrik Berthold Hermle AG, Gosheim (DE)

( * ) Notice: Subject to any disclaimer, the term of this patent is extended or adjusted under 35 U.S.C. 154(b) by 0 days.

(21) Appl. No.: 09/881,755

(22) Filed: Jun. 18, 2001

(30) Foreign Application Priority Data

Jun. 17, 2000 (EP) .............................................. 00112828

(51) Int. Cl.[7] .............................. B23Q 5/14; B23B 3/22; B23C 1/00
(52) U.S. Cl. ............................... 29/39; 29/55; 74/820; 74/826; 82/121; 408/133; 409/231
(58) Field of Search ........................... 29/39, 40, 27 C, 29/48.5 R, 53, 55, 64; 82/120, 126, 159, 121; 74/820, 826, 813 L, 813 R, 346, 724; 409/231, 232; 408/133

(56) References Cited

U.S. PATENT DOCUMENTS

| 3,653,282 A | * | 4/1972 | Bouffiou et al. ............ 29/39 X |
| 3,797,333 A | * | 3/1974 | Mater ........................... 74/826 |
| 4,008,647 A | * | 2/1977 | Hague et al. ............ 408/133 X |
| 4,286,479 A | * | 9/1981 | Baumann et al. .............. 74/724 |
| 4,656,708 A | * | 4/1987 | Smith et al. .................... 29/40 |
| 4,989,303 A | * | 2/1991 | Sauter et al. .............. 74/813 X |
| 5,782,593 A | * | 7/1998 | Klement ..................... 409/231 |
| 5,842,392 A | * | 12/1998 | Pfeifer et al. .................. 82/120 |
| 5,974,907 A | * | 11/1999 | Song ........................... 74/346 |
| 6,257,111 B1 | * | 7/2001 | Shinohara et al. ......... 82/121 X |

FOREIGN PATENT DOCUMENTS

| DE | 3205446 A1 | 9/1983 | |
| EP | 0198223 A1 | 10/1986 | |
| WO | 96/06708 | * 3/1996 | .................. 74/820 |
| WO | WO 99/12700 A1 | 3/1999 | |

* cited by examiner

Primary Examiner—William Briggs
(74) Attorney, Agent, or Firm—Browdy and Neimark

(57) ABSTRACT

A rotary drive adapted to perform a speed of rotation switching of a tool holding device, comprising an output drive shaft bearing the tool holding device, said output drive shaft being able to be moved into first and second axial positions by means of a setting drive. The output drive shaft is coupled in the first axial position with a power driven first drive gear wheel and in the second axial position with a concentric tubular shaft, which is adapted to be driven by a power driven second drive gear wheel by way of a worm drive.

14 Claims, 1 Drawing Sheet

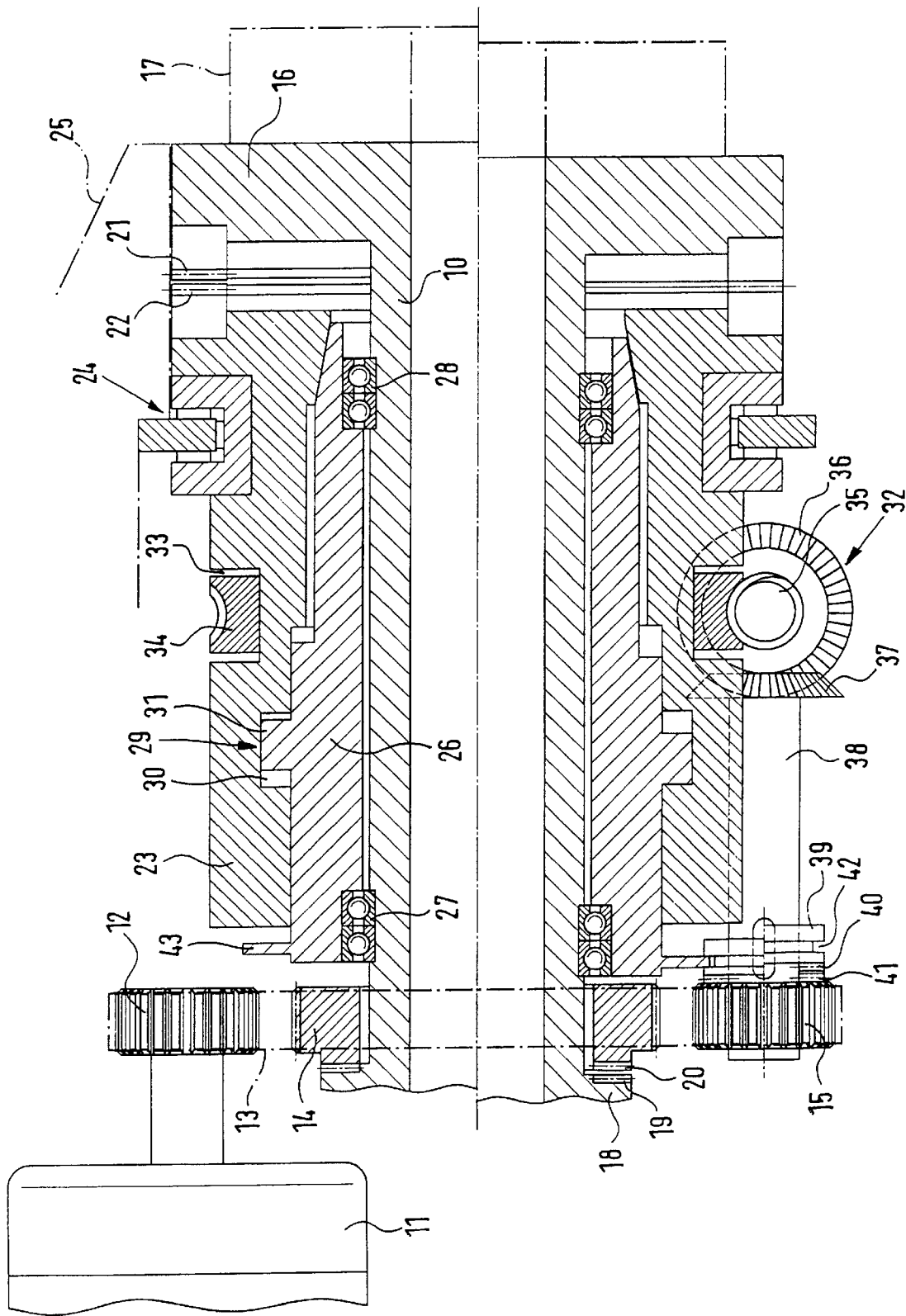

ROTARY DRIVE WITH A SPEED

BACKGROUND OF THE INVENTION

The invention relates to a rotary drive with a speed changing means for a tool holding device as is for instance described in the patent publication WO 99/127000. Modern machining centers are frequently designed for machining by turning and also milling. The tool holding means is thus designed for milling and turning tools, for which purpose a common tool changing device is often provided. During milling the tool is subjected high torques at a relatively low speed of rotation whereas during machining by turning at low torques speeds of rotation are high. Accordingly the rotary drive for the tool holding device requires a speed changing means, which does justice to the different torques required.

SHORT SUMMARY OF THE INVENTION

One object of the invention is to provide an improvement and simultaneously a simplification of the known rotary drive having a means for changing the speed of rotation to meet said requirements.

In order to achieve these and/or other objects appearing from the present specification, claims and drawings, in the present invention a rotary drive for a tool holding device meets this requirement because it possesses an output drive shaft bearing the tool holding device and which is able to be moved by means of a setting drive into two different axial positions, the output drive shaft being coupled in the first axial position with a power driven first drive gear wheel and in the second axial position with a concentric tubular shaft, which is driven by the intermediary of a worm drive from a second power driven drive gear wheel.

The rotary drive of the invention is, unlike the known rotary drive, completely free of collets, brake jaws and brake disks, which at the torques involved are subjected to undesired wear. The changing of speed takes place in a simple manner using a single, simple setting drive by axial movement of the output drive shaft between two coupling positions. The power drive can in the case of this rotary drive be designed in a simplified manner. Furthermore, the rotary bearings for the different components are simplified in the rotary drive of the invention.

The claims define features representing advantageous further developments and improvements in the rotary drive.

The two drive gear wheels are preferably able to be driven using a gear wheel or toothed belt drive from an electric motor so that there is an economic, simpler and readily assembled power drive. For the coupling between the output drive shaft and the first drive gear wheel on the one hand and the concentric tubular shaft on the other hand it is best for two coupling means of the Hirth type to be provided.

Owing to the exclusive use of toothed couplings a reliable and low-wear coupling means is realized, by which heavy torques may be transmitted.

In keeping with an advantageous form of this coupling the output drive possesses two radial tooth rings, of which the first one in the first axial position of the output drive shaft meshes with a radial gear ring of the first drive gear wheel and the second meshes in the second axial position of the output drive shaft with a radial tooth ring on the concentric tubular shaft, the teeth of the two radial tooth rings of the output drive shaft preferably being oppositely directed. It is therefore possible to switch over between the first coupling and the other coupling simply by a small shift of the output drive shaft.

In keeping with a preferred form of the setting drive same possesses a second concentric tubular shaft, which is rotatably mounted on the output drive shaft and is axially coupled with same, a setting member being provided for axially shifting the second concentric tubular shaft. This setting member is preferably arranged between the second tubular shaft and the axially fixed first tubular shaft and is more particularly in the form of a fluid power setting cylinder, which preferably is simply constituted by an annular groove machined therein and an annular element fitting into the groove. The output drive shaft can consequently be axially shifted by the second concentric tubular shaft without such second axial tubular shaft having to rotate with it.

Using a coupling means actuated by the setting drive for decoupling the second drive gear wheel from the first concentric tubular shaft in the axial position of the output drive shaft it is possible to ensure that such second drive gear wheel is able to continuously rotate therewith, and is thus constantly drivingly connected with the drive motor despite the fact that the worm drive and accordingly the rotary movement of the first concentric tubular shaft is able to be decoupled, when such movements are not required. This means that wear of the respective components is reduced.

In accordance with an advantageous design of the coupling means the second concentric tubular shaft possesses an entraining dog for causing corresponding axial displacement of a coupling gear wheel having radial teeth, which is arranged on a drive shaft of the worm drive with which it is locked in rotation while being able to be slid axially and is furthermore able to be coupled with a radial gear ring on the second drive gear wheel. Here as well there is again an absence of any friction coupling.

In a convenient development of the invention the worm drive possesses an annular worm wheel keyed on the first concentric tubular shaft and furthermore a worm drivingly connected with the same, such worm being able to be driven by the second drive gear wheel, more especially by way of an angle drive.

It is an advantage for the first concentric tubular shaft to be rotatably mounted as an outer tubular shaft in a housing of the rotary drive, bearing means preferably being provided to take up axial forces occurring during machining.

DETAILED ACCOUNT OF WORKING EMBODIMENT OF THE INVENTION.

One embodiment of the invention is illustrated in the drawing and will be described in the following account in detail. The single FIGURE shows a partly diagrammatic cross sectional view of a rotary drive with a speed of rotation switching over means for a tool holding device as a working example of the invention.

In the case of the embodiment illustrated in the single FIGURE in the form of a rotary drive the top half of the drawing shows an output drive shaft 10 in a first switching and axial position for machining by turning, in the case of which high and low speeds of rotation are required and in the bottom half of the drawing in a second switching and , respectively, axial position for machining by milling, for which the rotary drive operates at low speeds of rotation and with heavy torques.

By way of a motor gear wheel 12 by the intermediary of a toothed belt 13 an electric drive motor 11, only illustrated in part, drives a first drive gear wheel 14 and a second drive gear wheel 15 continuously. Instead of a toothed belt 13 it is of course possible to utilize a different known drive linkage, or however it is possible for the motor gear wheel 12 to drive the drive gear wheels 14 and 15 directly by toothed engagement.

The output drive shaft 10 in the form of a tubular shaft possesses a radially enlarged terminal zone 16, which bears a tool holding device 17, which is only indicated diagrammatically, and in which alternatively milling and turning tools may be held. The turning tools may for example be in the form of turrets with lathe tools as well. Conveniently necessary hydraulic lines for tightening and/or releasing the tools, which are for instance trained through the output drive shaft 10, are not illustrated for the sake of simplicity.

Adjacent to the first drive gear wheel 14, which in the form of an annular gear wheel fits around the output drive shaft 10, the output drive shaft 10 also possesses a stepped region 18 of increased diameter, a Hirth gear ring 19 with radially aligned teeth being provided on the radial face. Axially opposite to same on the first drive gear wheel 14 as well a corresponding Hirth gear ring 20 is arranged. It is of course possible to employ other designs of gear rings with radial teeth. Accordingly on the radially enlarged terminal region 16 of the output drive shaft 10 there is also a Hirth gear ring 21 and axially opposite thereto a Hirth gear ring 22 on a first tubular shaft 23 surrounding the output drive shaft 10. The teeth of the two gear rings 19 and 21 on the output drive shaft 10 face one another in this case. In this respect the arrangement is so designed that the axially sliding output drive shaft 10 is either in mesh with the first drive gear wheel 14 (top half of the representation) or with the first tubular shaft 23 (bottom half of the FIGURE).

The first tubular shaft 23 is supported by means of a bearing arrangement 24 in the a housing 25 indicated in chained lines diagrammatically of the rotary drive, without however being able to move axially. The bearing arrangement 24 is designed to take up radial and also axial forces. For the sake of simplicity only a single bearing arrangement 24 is illustrated, although in fact in case of need naturally further bearing points may be provided.

Between the first tubular shaft 23 and the output drive shaft 10 a further, second tubular shaft 26 is placed. The second tubular shaft 26 is rotatably supported by means of two bearing arrangements 27 and 28 allowing rotation but not axial motion, on the output drive shaft 10 and able to be slid axially in relation to the first tubular shaft 23. Such axial shifting is caused by a fluid power setting cylinder 29, whose cylinder space is delimited on the one hand by an annular groove 30 in the first tubular shaft 23 and on the other hand by the second tubular shaft 26 closing off such annular groove 30. Into the annular groove 30 constituting the cylinder space there extends an annular projection 31, serving as a piston, on the outer side of the second tubular shaft 26. For causing relative sliding between the two tubular shafts 23 and 26 the fluid power setting cylinder 29 is for instance put under pressure by hydraulic fluid, the setting cylinder 29 being in the form of a double acting setting cylinder or as a single acting setting cylinder with spring return means. These features are omitted from the drawing for the sake of simplicity.

A worm drive 32 comprises an annular worm wheel 34 locked in a peripheral groove 33 in the first tubular shaft 23 with external teeth, and which is in mesh with a worm 35, whose axis of rotation is perpendicular to the axis of rotation of the worm wheel 34, the worm 35 being supported for rotation stationarily in the housing 25. A first bevel wheel 36 locked in rotation with the worm 35 meshes with a second bevel wheel 37, which is arranged on a common shaft 38 with the second drive gear wheel 15. For coupling and decoupling the shaft 38 with the second drive gear wheel 15 use is made of a coupling wheel 39 on this shaft 38, which wheel 39 is provided with a Hirth gear ring 40 on its end adjacent to the second drive gear wheel 15. A mating Hirth gear ring 41 arranged oppositely on one side of the second drive gear wheel 15. The coupling gear wheel 39 is locked in rotation but in an axially sliding fashion on the shaft 38 and possesses a peripheral annular groove 42, into which there fits an annular entrainment dog 43 on the second tubular shaft 26 so that the coupling gear wheel 39 is axially entrained on sliding of the second tubular shaft 26 in order to couple and decouple the connection with the second drive gear wheel 15. The second drive gear wheel 15 in the bottom half of the FIGURE is represented with one half in the coupled and one half in the decoupled state.

The two drive gear wheels 14 and 15 are constantly driven by the electric drive motor 11. For rapid rotational movements of the output drive shaft 10 the fluid power setting cylinder 29 is so driven that the coupling position illustrated in the top half of the FIGURE is produced. By actuation of the fluid power setting cylinder 29 the second tubular shaft 26 will be moved, and with it the output drive shaft 10 to the right until the first drive gear wheel 14 meshes with the output drive 10 while the gear rings 21 and 22 are not in mesh. Furthermore, the gear rings 40 and 41 are out of mesh so that the shaft 38 and accordingly the worm drive 32 is not driven by the second drive gear wheel 15. This means that the output drive shaft 10 is rapidly rotated by the direct drive whereas the two tubular shafts 23 and 26 do not turn. The first tubular shaft 23 is halted by the worm 35, whereas the second tubular shaft 26 is halted by the friction on the first tubular shaft 23.

If the arrangement is switched over to slower milling the setting cylinder 29 is actuated in the opposite direction or, respectively, moved in the opposite direction by spring loading into the opposite position so that the second tubular shaft 26 shifts the output drive shaft 10 to the left until the gear rings 21 and 22 are in mesh and the gear rings 19 and 20 are out of mesh. This means that the output drive shaft 10 is decoupled from the first drive gear wheel 14. Simultaneously the gear rings 40 and 41 come into mesh so that the second drive gear wheel 15 drives the shaft 38 and therefore the worm drive 32. With the aid of this worm drive 32 the first tubular shaft 23 is caused to turn slowly and owing to the mesh between the gear rings 21 and 22 drives the output drive shaft 10 accordingly.

In the case of the simplified and partly diagrammatic FIGURE no attempt has been made to represent inherently necessary details. Thus further bearings are necessary in order for the rotary movement as described to take place.

What is claimed is:

1. A rotary drive for switching or changing a speed, between different values, of a tool holding device, comprising an output drive shaft bearing the tool holding device, said output drive shaft being able to be moved into first and second axial positions by means of a setting drive, the output drive shaft being coupled in the first axial position with a power driven first drive gear wheel and in the second axial position with a concentric tubular shaft, which is adapted to be driven by a power driven second drive gear wheel by way of a worm drive.

2. The rotary drive as set forth in claim 1, wherein the two drive gear wheels are arranged to be driven by way of a gear wheel or toothed belt drive and an electric drive motor.

3. The rotary drive as set forth in claim 1, wherein for producing a coupling action between the output drive shaft and the first drive gear wheel on the one hand and the concentric tubular shaft on the other hand two coupling means are provided in the form of Hirth gear means.

4. The rotary drive as set forth in claim 3, wherein the output drive shaft has two radial gear rings, of which the first one in the first axial position of the output drive shaft meshes with a radial gear ring of the first drive gear wheel and the second one meshes in the second axial position of the output drive shaft with a radial gear ring of the concentric tubular shaft, the teeth of the two radial gear rings of the output drive shaft being preferably directed toward one another.

5. The rotary drive as set forth in claim 1, wherein the setting drive includes a second concentric tubular shaft, which is rotatably supported on the output drive shaft and is axially coupled with same, a setting member being provided for axial displacement of the second concentric tubular shaft.

6. The rotary drive as set forth in claim 1, wherein the setting member is arranged between the second tubular shaft, and the axially fixed first tubular shaft.

7. The rotary drive as set forth in claim 1, comprising a coupling means able to be actuated by the setting drive for decoupling the second drive gear wheel from the first concentric tubular shaft in the first axial position of the output drive shaft.

8. The rotary drive as set forth in claim 7, wherein the setting drive includes a second concentric tubular shaft, which is rotatably supported on the output drive shaft and is axially coupled with same, a setting member being provided for axial displacement of the second concentric tubular shaft and wherein the second concentric tubular shaft possesses an entrainment dog for corresponding axial displacement of a coupling wheel having radial teeth, which wheel is arranged on a drive shaft for the worm drive in a rotationally locked but axially moving manner and is able to be coupled with a radial gear ring on the second drive wheel.

9. The rotary drive as set forth in claim 1, wherein the worm drive includes an annular worm wheel locked in rotation on the first concentric tubular shaft and furthermore a worm drivingly connected with same, which worm is able to be driven by the second drive gear wheel.

10. The rotary drive as set forth in claim 1, wherein the first concentric tubular shaft constitutes outer shaft in a housing of the drive.

11. The rotary drive of claim 6 wherein said setting member comprises a fluid power setting cylinder.

12. The rotary drive of claim 11 wherein said fluid power setting cylinder comprises an annular groove and an annular element extending into said annular groove.

13. The rotary drive of claim 9 wherein said second drive gear wheel is able to drive said worm by way of an angle drive.

14. The rotary drive of claims 10 further comprising bearing means adapted to resist axial forces.

* * * * *